US006671276B1

(12) United States Patent
Bakre et al.

(10) Patent No.: US 6,671,276 B1
(45) Date of Patent: *Dec. 30, 2003

(54) SWITCH BASED NETWORK ARCHITECTURE FOR IP MULTICAST AND INTEGRATED SERVICES

(75) Inventors: Ajay V. Bakre, San Jose, CA (US); Takeshi Nishida, Sunnyvale, CA (US)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,748

(22) Filed: Nov. 18, 1997

(51) Int. Cl.[7] .............................................. H04L 12/28
(52) U.S. Cl. ................... 370/395 L; 370/390; 370/396; 370/401
(58) Field of Search .............................. 370/395 L, 390, 370/432, 396, 397, 398, 399, 400, 401, 409, 352, 353, 354, 355, 905, 395.5; 709/224, 225, 226, 227, 228, 229

(56) References Cited

U.S. PATENT DOCUMENTS

| 5,331,637 A | * | 7/1994 | Francis et al. | 370/408 |
|---|---|---|---|---|
| 5,541,927 A | * | 7/1996 | Kristol et al. | 370/408 |
| 5,583,862 A | * | 12/1996 | Callon | 370/397 |
| 5,748,736 A | * | 5/1998 | Mittra | 380/21 |
| 5,802,056 A | * | 9/1998 | Ferguson et al. | 370/403 |
| 5,898,686 A | * | 4/1999 | Virgile | 370/381 |
| 5,903,559 A | * | 5/1999 | Acharya et al. | 370/355 |
| 5,946,316 A | * | 8/1999 | Chen et al. | 370/408 |
| 5,996,021 A | * | 11/1999 | Civanlar et al. | 709/238 |
| 6,049,546 A | * | 4/2000 | Ramakrishnan | 370/412 |

FOREIGN PATENT DOCUMENTS

JP 9-64915 3/1997

OTHER PUBLICATIONS

A. Acharya, et al., "IP Switching Over Fast ATM Cell Transport (IPSOFACTO)," Proc. Of IEEE Globecom Jul., 1997.
G.J. Armitage, "Support for Multicast over UNI 3.0/3.1 based ATM Network," Network Working Group, Category: Standards Track, Request for Comments 2022, Nov., 1996.
G.J. Armitage, "VENUS–Very Extensive Non–Unicast Service," Internet Engineering Task Force, Network Working Group, Request for Comments: 2191, Category: Informational, Sep., 1997.
ATM User–Network Interface (UNI) Signaling Specification Version 4.0, The ATM Forum Technical Committee, Jul., 1996.
E. Basturk et al., "Design and Implementation of a QoS Capable Switch–Router," Proc. of the Int'l Conference on Computer Communications and Networks (IC3N), Sep., 1997.
L. Berger, "RSVP over ATM Implementation Requirements," Internet Draft, <draft–ietf–issll–atm–imp–req–01.txt> Jul. 11, 1997.

(List continued on next page.)

Primary Examiner—Hassan Kizou
Assistant Examiner—Saba Tsegaye
(74) Attorney, Agent, or Firm—Sughrue Mion, PLLC

(57) ABSTRACT

A method and a network architecture for mapping Internetworking Protocol (IP) multicast and Integrated Services (i.e. differing levels of quality of service) over asynchronous transfer mode (ATM) networks, based upon multicast switches, allowing IP/resource reservation protocol (RSVP) applications running on ATM hosts to seamlessly participate in Internet-wide multicast sessions. The method and architecture employ ATM capabilities to support features such as receiver heterogeneity, shortcut routing and scalability.

39 Claims, 6 Drawing Sheets

Functional architecture of a Multicast Switch (MSW)

OTHER PUBLICATIONS

A. Birman, et al., "Provisioning of RSVP–based Services over a Large ATM Network," IBM Research Report (Computer Science) #RC 20250, Oct., 1995.

R. Braden et al., "Resource ReSerVation Protocol (RSVP) Version 1 Functional Specification," Internet Task Force, Network Working Group, Request for Comments: 2205, Category: Standards Track, Sep., 1997.

E. Crawley et al., "A Framework for Integrated Services and RSVP over ATM," Internet Engineering Task Force, Internet Draft, <draft–ietf–issll–atm–framework–00.txt>, Jul. 24, 1997.

R. Guerin et al., "Support of Shortcuts for RSVP Flows Over ATM," Internet Engineering Task Force, Internet Draft <draft–guerin–issll–rsvp–shortcut–00.txt> Jul. 30, 1997.

Y. Katsube et al., "Toshiba's Router Architecture Extensions for ATM: Overview," Network Working Group, Request for Comments: 2098, Category: Informational, Feb. 1997.

M. Laubach et al., Classical IP and ARP over ATM, Network Working Group, Internet Draft, Obsoletes 1577, 1622, <draft–ion–ipatm, classic2–03.txt> Oct. 6, 1997.

J.V. Luciani et al., "NBMA Next Hop Resolution Protocol (NHRP)," Routing Over Large Clouds Working Group, Internet Draft <draft–ietf–rolc–nhrp–12.txt> Mar., 1997.

P. Newman et al., "Transmission of Flow Labeled IPv4 on ATM Data Links Ipsilon Version 1.0," Network Working Group, Request for Comments 1954, Category: Informational, May, 1996.

Private Network–Network Interface Specification Version 1.0 (PNNI) 1.0), The ATM Forum Technical Committee, Mar., 1996.

Shenker et al., "Specifiction of Guaranteed Quality of Service," Network Working Group, Request for Comments: 2212, Category: Standards Track, Sep., 1997.

R. Talpade et al., "Multicast Server Architectures for MARS–based ATM Multicasting," Network Working Group, Category: Informational, Request for Comments 2149, May, 1997.

R. Venkatswaran et al., "Hierarchical Multicast Routing in Wide–Area ATM Networks," Proc. of the Intl. Communications Conf. (ICC '96), Jun., 1996.

D. Waitzman et al., "Distance Vector Multicase Routing Protocol," Network Working Group, Request for Comments 1075, Nov., 1988.

J. Wroclawski, "Specification of the Controlled–Load Network Element Service," Network Working Group, Request for Comments: 2211, Category: Standards Track, Sep., 1997.

Grenville J. Armitage, "IP Multicasting Over ATM Networks", Published by IEEE Journal on Selected Areas in Communication, vol. 15 No. 3, Apr. 1997.

* cited by examiner

A SYSTEM MODEL FOR RSVP OVER ATM MAPPING

NETWORK ARCHITECTURE FOR MAPPING IP MULTICAST AND INTEGRATED SERVICES OVER ATM

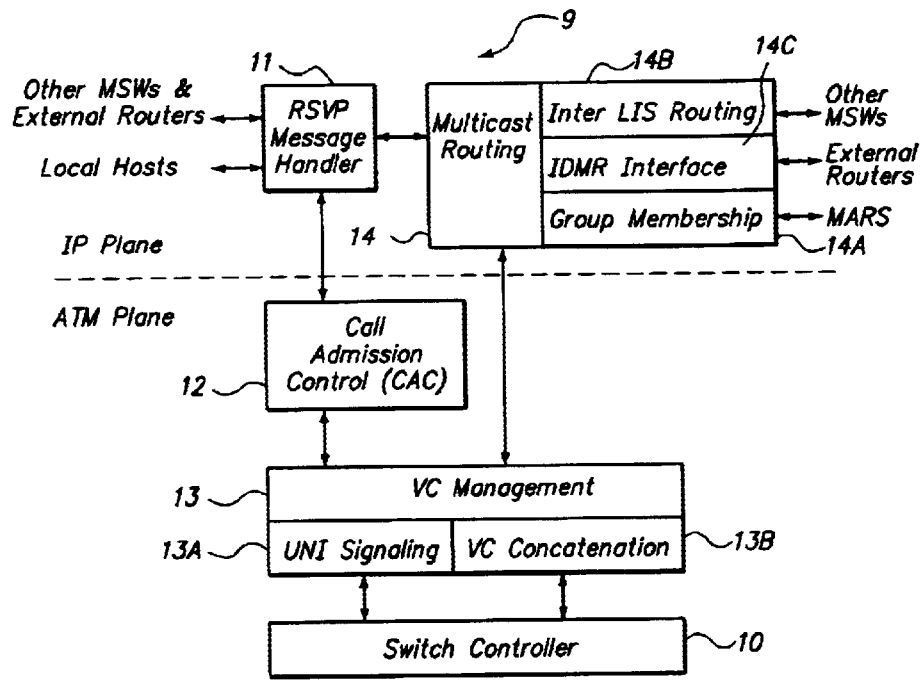
FIG. 3  Functional architecture of a Multicast Switch (MSW)
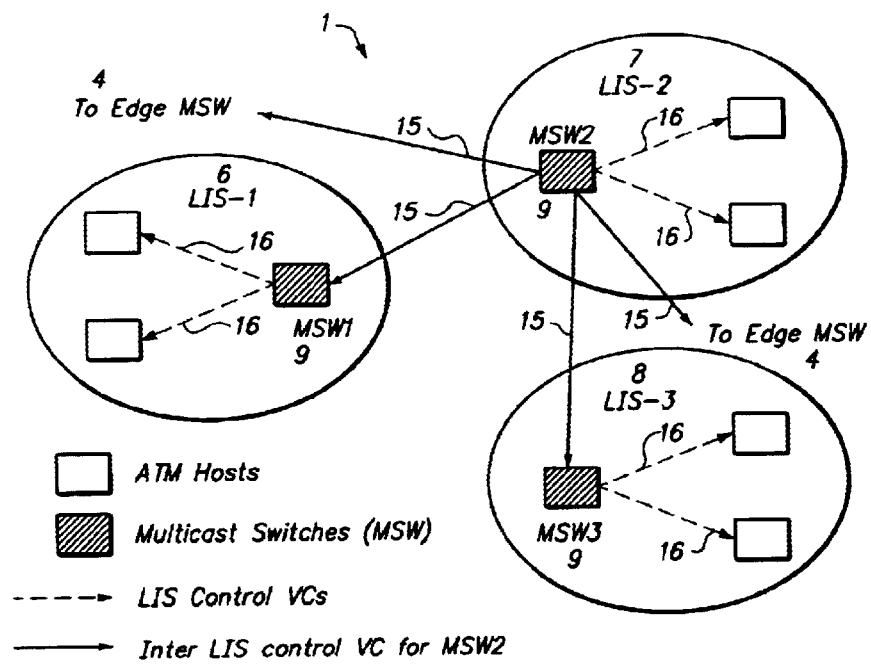
FIG. 4  Intra and inter LIS control VCs Data VCs for multicasting within an LIS RSVP over ATM example: stage I RSVP over ATM example: stage II RSVP over ATM example: stage III

SWITCH BASED NETWORK ARCHITECTURE FOR IP MULTICAST AND INTEGRATED SERVICES

BACKGROUND OF THE INVENTION

1. Field of the Invention

The present invention relates to a method and a network architecture for mapping Internetworking Protocol (IP) multicast and Integrated Services (i.e. differing levels of quality of service) over an Asynchronous Transfer Mode (ATM) network. The method and architecture, which are based upon multicast switches, allow IP/Resource. Reservation Protocol (RSVP) applications running on ATM hosts to seamlessly participate in Internet-wide multicast sessions. The method and architecture make good use of ATM capabilities to support features such as receiver heterogeneity, shortcut routing and scalability.

2. Description of the Related Art

The current Internet services, including IP multicast, are based on best effort delivery of datagrams as the sole underlying mechanism. The best effort delivery mechanism however, is not suitable for transporting media streams such as audio and video over the Internet, since applications using such streams often require data delivery with delay and bandwidth guarantees for a successful replay of media streams at the receiving end. Furthermore, Internet traffic continues to grow faster than the speed at which additional capacity is being added to the Internet infrastructure. This means that data traffic traversing the Internet is subject to unpredictable delays and possibly packet loss due to the increased load on Internet routers.

While traditional Internet applications such as email, file transfer, remote login etc., based on transmission control protocol (TCP), can adapt their network usage to the prevailing conditions, emerging multimedia applications, such as video on demand and those based on streaming video, are less tolerant to changes in traffic parameters such as end-to-end delay and jitter. The only way to support these multimedia applications (other than over engineering the Internet capacity) is to provide multiple service classes and a capability of reserving resources in the Internet.

As a result of the efforts of the Internet Engineering Task Force (IETF) (See, e.g., Wroclawski, Specification of the Controlled-Load Network Element Service, Network Working Group, Request for Comments: 2211, Category: Standards Track, September, 1997; and Shenker et al., Specification of Guaranteed Quality of Service, Network Working Group, Request for Comments: 2212, Category: Standards Track, September, 1997), support for Quality of Service (QoS) based service classes, known as Integrated Services, is expected to become available in the Internet in the near future. In addition, Resource Reservation Protocol (RSVP) is also being standardized by the IETF as an internetworking protocol for resource reservation that will be used by applications in the multi-service Internet. See, R. Braden, et al., "Resource Reservation Protocol (RSVP)—Version 1 Functional Specification," Internet Engineering Task Force, Network Working Group, Request for Comments: 2205, Category: Standards Track, September, 1997.

Asynchronous Transfer Mode (ATM) has been developed as an integrated link layer and network layer solution for providing QoS based services in local and wide area networks. Although the ATM technology supports its own version of QoS based services, it is unlikely that ATM networks will completely replace the existing IP based Internet infrastructure in the foreseeable future. Therefore, at least in the initial stages of ATM deployment, hosts connected to ATM networks will continue to run IP and RSVP applications in order to communicate with other hosts, most of which may still be connected to legacy networks, such as Ethernet.

Since the ATM technology readily provides the QoS support needed for IP Integrated Services, the problem of mapping these services over an ATM network appears to be simple. However, such a mapping is quite difficult due to the following reasons:

(1) Since IP is the network layer protocol of choice for use with RSVP, all the network technologies ranging from Ethernet to Token Ring to ATM will be treated as link layer technologies by RSVP/IP. Such an approach does not give rise to any conflicts with the use of conventional network technologies such as Ethernet, but with ATM networks this approach has an inherent problem in that it fails to make use of the network layer capabilities (addressing and routing) of ATM;

(2) IP multicasting, which is at the core of Integrated Services and RSVP, is being deployed widely in the existing IP networks. On the other hand, support for efficient multicasting in ATM is still inadequate. Point-to-multipoint virtual circuits (VCs), although supported in ATM, suffer from scalability problems; and (3) Some of the RSVP features, namely receiver heterogeneity and dynamic QoS, do not have equivalent mechanisms in ATM.

One proposal to deal with the provision of IP Integrated Services over ATM is the Cell Switch Router (CSR) from Toshiba. See, Katsube, et al., "Toshiba's Router Architecture Extensions for ATM: Overview," Network Working Group, Request for Comments: 2098, Category: Informational, February, 1997. A CSR is a traditional IP router attached to an ATM switch and is capable of "concatenating" incoming and outgoing VCs to provide shortcut paths through routers in an ATM cloud. Individual intra-logical IP subnet (LIS) VCs (host to router or router to router) are established using ATM signaling. Such VCs may be point to point for unicast, or point to multipoint for multicast. Different VCs may be established for different "flows" between the same set of endpoints to allow for a different QoS for each flow, e.g. using RSVP. The problem is that CSRs use IP based protocols to route data traffic and thus limit the use of ATM protocols to intra-LIS routing. Some of the disadvantages of this approach are:

(1) A true shortcut path between two endpoints may not go through a router (CSR) which is given as the next hop by IP routing. This is because IP routing needs to send all data crossing subnet boundaries through a router (CSR);

(2) Wide area addressing and routing capabilities of ATM are not utilized properly by this approach since ATM is used only as a link layer; and (3) Currently there is no proposal to handle heterogeneous QoS receivers in a multicast session with CSRs.

Two other recent proposals dealing with IP switching, are IPSILON and IPSOFACTO. See, A. Acharya, et al., "IP switching over fast ATM cell transport (IPSOFACTO), Proc. Of IEEE Globecom '97, 1997; and P. Newman, et. al., "Transmission of Flow Labeled Ipv4 on ATM Data Links Ipsilon Version 1.0", Network Working Group, Request for Comments 1954, Category: Informational, May, 1996. IP switching "identifies" long lived IP flows passing through a switch router (IP switch) and places such flows on a fast switched path so that subsequent data packets on these flows do not incur reassembly, routing and segmentation delays at the router. IPSILON uses a heuristic based on the number of packets with the same source and destination addresses to identify a long lived flow. IPSOFACTO relies on the control packets of higher layer protocols, e.g. SYN packets in TCP, to identify long lived flows. Once a long lived flow is identified, it is assigned a new Virtual Circuit Indicator/Virtual Path Indicator (VCI/VPI) by the IP switch. At the same time, an association between the incoming VCI/VPI and outgoing VCI/VPI is established in the switching fabric so that subsequent data packets are forwarded without any intervention by the routing software. IPSILON relies on a proprietary protocol for assigning VCI/VPI to IP flows between two IP switches. IPSOFACTO uses a technique based on partitioning of VCI/VPI space and chooses an unused VCI/VPI from this space for forwarding a flow through each IP switch. The only difference between the two IP switching techniques and the CSR technique described earlier is the way shortcut VCs are established by the switch/router. Apart from this difference, the two IP switching techniques and CSR rely on IP routing software to make routing decisions. As such, all the drawbacks listed earlier for CSR, apply equally well to the two IP switching techniques.

Additionally, the IP over Non-broadcast Multiple Access (NBMA) networks (ION) working group of the IETF has developed a proposal for IP multicast over ATM which is based on Multicast Address Resolution Servers (MARSs) See G. J. Armitage, Support for multicast over UNI 3.0/3.1 based ATM networks, Network Working Group, Category: Standards Track, Request for Comments 2022, November 1996. An enhancement to the basic MARS approach is the concept of a Multicast Server (MCS). See R. Talpade, et al., Multicast server architectures for MARS-based ATM multicasting, Network Working Group, Category: Informational, Request for Comments 2149, May 1997, which helps aggregate traffic from multiple senders to a given multicast group. If one active MARS per LIS is used in an ATM cloud, point-to-multipoint VCs for multicast distribution are confined to LIS boundaries and inter LIS multicast forwarding is accomplished by multicast routers. Shortcut routing of multicast traffic is not possible in such a case. On the other hand, if one MARS is used for the whole ATM cloud, point-to-multipoint VCs may span the whole ATM cloud which causes scaling problems if the number of ATM hosts in the ATM cloud is large. See G. J. Armitage, VENUS—Very Extensive Non-Unicast Service, Internet Engineering Task Force, Network Working Group, Request for Comments: 2191, Category: Informational, September, 1997. As a comparison, the inventive network architecture, discussed in more detail below, is scalable since it uses separate VCs for intra and inter LIS multicast traffic, while allowing shortcut routing by concatenating these VCs at multicast switches (MSWs). Another problem with the MARS/MCS approach is the inability of multicast senders to communicate QoS requirements to the MCS for the multicast traffic originating from the sender. However, in the present invention, since the MSW is the termination point for RSVP messages within an LIS, using it as an MCS allows the use of QoS VCs from the sender to the MSW/MCS.

In yet another proposal, the Integrated Services over Specific Link Layers (ISSLL) working group of the IETF deals with the mapping of Integrated Services over ATM, treating it as a link layer technology. The current proposals in the ISSLL working group for mapping RSVP over ATM (see Crawley et al., A Framework for Integrated Services and RSVP over ATM, Internet Engineering Task Force, Internet Draft, <draft-ietf-issll-atm-framework-00.txt>, Jul. 24, 1997; and Berger, RSVP over ATM Implementation Requirements, Internet Draft, <draft-ietf-issll-atm-imp-req-00.txt>, Jul. 11, 1997), recommend supporting a modified homogeneous model as an approximation to full receiver heterogeneity. In the proposed scheme, all QoS receivers are served by a single QoS VC, and best effort receivers are served by a separate best effort VC if they cannot be served by the QoS VC. The ISSLL proposals contain no clear discussion of multicasting across LISs (i.e., inter-LIS multicasting). Although it allows the existence of a MARS and also some shortcut routing, it is not clear if a single point-to-multipoint VC per sender (or MCS) will span the ATM cloud connecting senders directly with receivers or if IP routers will be called in to route multicast traffic between LISs. A part of the confusion stems from the fact that the ISSLL group by definition is constrained to treat ATM as a link layer technology, although ATM can be utilized to perform routing functions as well. Shortcut routing, which allows multicast traffic to bypass multicast routers and requires a broader outlook, clearly falls outside the purview of the ISSLL working group.

Another recent proposal in the ISSLL group uses Next Hop Resolution Protocol (NHRP) to establish shortcut paths with QoS between two hosts/routers connected to an ATM network. See, Guerin et al., Support of Shortcuts for RSVP Flows Over ATM, Internet Engineering Task Force, Internet Draft <draft-guerin-issll-rsvp-shortcut-00.txt>. See also, Luciani et al., NBMA Next Hop Resolution Protocol (NHRP), Routing Over Large Clouds Working Group, Internet Draft <draft-ietf-rolc-nhrp-12.txt>. Although this proposal does establish a shortcut path between the two end-points using ATM signaling, it does not handle the multicast case since NHRP cannot resolve multicast IP addresses to ATM addresses.

Another proposal discusses different alternatives for establishing RSVP reservations for unicast and multicast flows. Various methods are described to achieve both root-initiated (root of the multicast tree) and leaf-initiated (a leaf could be a multicast receiver or an egress router) shortcut paths through an ATM network. Birman, et al. "Provisioning of RSVP-based services over a large ATM network," IBM Research Report (Computer Science) #RC 20250, October, 1995. However, all the methods described for establishing shortcut paths through the ATM network require modifications to RSVP processing at the routers. Furthermore, direct shortcuts from senders or ingress routers to receivers or egress routers do not scale if the number of multicast receivers is large. The aforementioned methods are described in a very general form and no concrete implementation details are mentioned. Additionally, there is no mention of how heterogeneous receivers can be supported. By contrast, the present invention, described below with reference to a preferred embodiment, implements a scalable network architecture based on multicast switches which provides shortcut paths that are incrementally established and concatenated for scalability. Support is also provided for heterogeneous receivers. No modifications are needed in RSVP processing. The aspects related to ATM and shortcut routing are handled only within multicast routing.

Another recent proposal describes the design and implementation of a switch router that is capable of providing quality of service using RSVP. E. Basturk et al., Design and implementation of QoS capable switch-router, Proc. of the Int'l Conference on Computer Communications and Networks (IC3N), Sept. 1997. Detailed design and implementation of the hardware in the switch router is presented. The switch router described can be thought of as a CSR from Toshiba (described earlier), augmented with QoS capabilities using RSVP. The proposed Switch-Router uses IP routing protocols and RSVP to establish unicast and multicast switched paths in an ATM network. The ATM network, as in Toshiba's CSR, is treated as a layer 2 network so that forwarding across subnet boundaries takes place via a router (switch router in this case). However, the switch router architecture is described in isolation without any mention of how such switch routers will work together to provide a scalable mapping of IP multicast and RSVP over sizable ATM networks with features such as receiver heterogeneity. There fore, most of the limitations arising out of the use of IP based protocols in ATM networks as described earlier in the discussion on Toshiba's CSR, apply to this switch router as well. In particular, the issues related to VC management for an ATM network consisting of a number of LISs and using the addressing and routing capabilities of ATM are not addressed in this paper. Furthermore, extensions to RSVP messages are required to carry VC information from one switch router to the other.

By contrast, the present invention describes a scalable network architecture based on multicast switches, which supports features such as shortcut paths and receiver heterogeneity. Details are provided below to show how multicast switches can operate together to provide IP multicast and Integrated Services in an ATM network, exploiting the routing and addressing capabilities of ATM as much as possible. Furthermore, no modifications are needed in RSVP messages in the inventive architecture.

SUMMARY OF THE INVENTION

The present invention provides a solution to the problem of supporting IP multicast and Integrated Services over ATM. The invention sets forth a method and network architecture, based on multicast switches for mapping IP multicast and Integrated Services over ATM networks. A multicast switch (MSW) is an ATM switch that can also perform the functions of an IP multicast router, including that of terminating RSVP messages. The primary problem addressed by the present invention is of mapping the protocol mechanisms (IP multicasting protocols and RSVP) that deliver IP multicast and Integrated Services to suitable mechanisms provided by ATM networks.

The present invention, in providing a solution for mapping IP multicast and Integrated Services over ATM, also provides a means for addressing the following objectives.

The first objective is to allow for receiver heterogeneity. RSVP allows different receivers in a multicast session to reserve resources with different QoS parameters. It is also possible that some receivers do not reserve any resources, but instead prefer to receive data with a best effort delivery mechanism. All such receivers must be supported by an RSVP over ATM mapping. Since a point-to-multipoint VC in ATM cannot have different QoS parameters associated with its different branches, supporting receiver heterogeneity may require multiple VCs with different QoS parameters.

The second objective is to provide for shortcut routing. Shortcut routing for unicast traffic in an ATM cloud helps eliminate intermediate routing steps by using the routing and addressing capabilities of ATM in case two communicating hosts are connected to the same ATM network. Using a mechanism like NHRP, a sender can find out the ATM address of the receiving host and establish a direct VC to it. Extending shortcut routing to multicast data traffic causes a variety of problems, however. First, using a shortcut point-to-multipoint VC for a multicast session in an ATM cloud will burden the sender with managing a VC that can potentially span multiple LISs and have a large number of recipients. Second, shortcut routing for multicast will allow data traffic to bypass multicast routers. This means that RSVP control messages (PATH and RESV) may follow a path that is different from the data path, giving rise to inconsistencies between the path characteristics computed by RSVP control messages and those actually encountered by the data traffic. A mapping must therefore clearly specify the manner of support for shortcut routing for multicast traffic.

The third objective is to provide adequate VC management. A mapping should specify how VCs are established for multicast data traffic and RSVP control traffic. This involves identification of the end points where a data or control VC terminates. This also involves delegation of VC management duties to senders and/or routers to handle changes in group membership. If a mapping supports direct point-to-multipoint VCs between a sender and all the receivers in an ATM cloud, the sender needs to manage the VC endpoints. When new receivers join the multicast session, they have to be added as leaf nodes to the point-to-multipoint VC. On the other hand, when existing receivers leave the multicast session, they have to be removed from the point-to-multipoint VC.

The fourth objective is to allow for dynamic QoS. RSVP allows multicast receivers to change their resource reservations at any time. Currently, User Network Interface (UNI) and Private Network Node Interface (PNNI) standards of the ATM Forum do not allow changing QoS parameters for an existing VC.

A fifth objective is to provide scalability. A mapping should be scalable to a large number of receivers and possibly a sizable number of senders as well. As noted above, direct point-to-multipoint VCs from a sender to all multicast receivers within an ATM cloud does not scale.

A sixth objective is to make efficient use of ATM capabilities. A mapping of IP multicast and RSVP over ATM should make use of ATM capabilities as much as possible even though some form of IP routing support will be required. A solution based purely on IP multicast routers is thus clearly undesirable.

A seventh objective is to provide interoperability. A mapping should ensure interoperability with Inter Domain Multicast Routing (IDMR) protocols that may be in use outside the ATM cloud. If the protocol used for multicasting within the ATM cloud is different from the one used outside the cloud, edge multicast switches should facilitate interoperation between the two. Support for native ATM applications should also be provided since it is very likely that host end systems connected to an ATM network will need native ATM access as well, in addition to an RSVP/IP interface.

BRIEF DESCRIPTION OF THE DRAWINGS

FIG. 3 shows functional architecture of a Multicast Switch (MSW) in accordance with the present invention.

FIG. 4 shows intra- and inter-LIS control VCs.

DETAILED DESCRIPTION OF THE PREFERRED EMBODIMENTS

Figure 1:
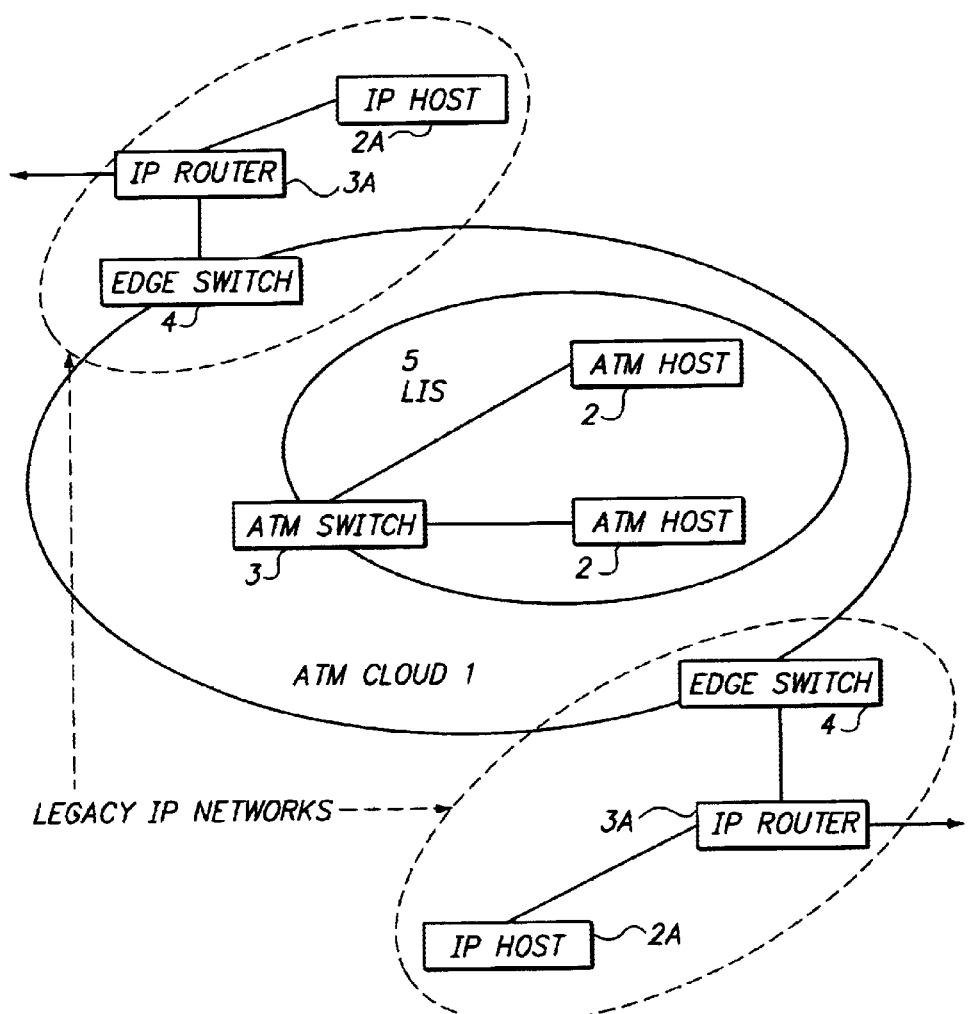
FIG. 1 shows a network consisting of ATM switches and hosts, known as an ATM cloud.

In order to understand the principles underlying the present invention, it is necessary to clearly define the problem of mapping IP multicast and Integrated Services over ATM. It is useful first to consider a network consisting of ATM switches and hosts, known as an ATM cloud, in which such a mapping is desired. An example network is shown in FIG. 1. All hosts and switches in the ATM cloud 1 need not be configured as IP hosts or routers. For purposes of this discussion, it can be assumed that some host machines are configured as IP hosts 2 and some switches 3 provide routing services to these IP hosts so that they can communicate with other hosts within, as well as outside the ATM cloud. Designated ATM switches at the border of this ATM cloud may connect to non-ATM technologies such as Ethernet and are known as edge switches 4. IP hosts 2A and IP routers 3A represent components of the external IP networks to which the ATM cloud is interconnected using the edge switches 4. Edge switches are required to have IP routing capabilities in order to connect the ATM cloud with other networks. Within the ATM cloud, it can be assumed that IP hosts are partitioned into logical IP subnets (LISs) 5 for administrative and addressing purposes. ATM Address Resolution Protocol (ARP) is used to resolve IP addresses to ATM addresses within an LIS. See Laubach et al., Classical IP and ARP over ATM, Network Working Group, Internet Draft, Obsoletes 1577, 1622, <draft-ion-ipatm, classic2-03.txt> Oct. 6, 1997. Unicast routing to other IP subnets may be provided by an IP router (possibly an IP switch running IP routing software) and/or by the use of Next Hop Resolution Protocol (NHRP) See J. V. Luciani, et al., NBMA next hop resolution protocol (NHRP), Internet Engineering Task Force, ION working group, Internet Draft, March 1997.

The problem of mapping IP multicast and Integrated Services over ATM consists of adequately and efficiently supporting services and applications based on IP multicast and RSVP over an ATM cloud. In the following discussion, first the mechanisms available in ATM standards to support IP multicasting and Integrated Services are outlined. Next, some issues that are addressed by the inventive mapping of IP multicast and RSVP over ATM are listed.

Multicasting in ATM

The ATM Forum, which is the standardizing body for ATM related protocols, has included some more multicasting provisions in its recent specifications on User Network Interface (UNI). See ATM user-network interface (UNI) signaling specification version 4.0, The ATM Forum Technical Committee, July 1996. In the earlier version (3.x) of UNI, multicasting was supported with point-to-multipoint virtual circuits (VCs). Each such VC is rooted at an ATM node (multicast sender), and any number of leaf nodes (multicast receivers) can be added after the VC is established. In UNI 4.0, a provision for leaf-initiated joins was added to point-to-multipoint VCs, thereby making the intervention of the root node unnecessary when leaf nodes need to be added to an existing point-to-multipoint VC.

Point-to-multipoint VCs are supported in the current signaling specifications (version 1.0) for Private Network Node Interface (PNNI). See Private network-network interface specification version 1.0 (PNNI 1.0), The ATM Forum Technical Committee, March 1996. The next version of PNNI is also expected to support leaf-initiated joins. Neither UNI 4.0 nor PNNI 1.0 supports changing the QoS parameters for a point-to-multipoint VC that is already established. UNI 4.0 also does not yet support different QoS parameter values for different branches in a single point-to-multipoint VC. These restrictions make it difficult to map RSVP based multicast to ATM point-to-multipoint VCs, since RSVP specifications allow individual receivers in the same multicast session to choose their own QoS parameters (i.e. provide receiver heterogeneity) and to change them at will subsequently (dynamic QoS).

Network Architecture

Generally, the inventive network architecture for mapping IP multicast and Integrated Services over ATM has the following features: (1) It is suitable for both best effort and QoS traffic; (2) It supports intra and inter LIS multicasting; (3) It supports shortcut routing and receiver heterogeneity; and (4) It is scalable to a large number of senders and receivers.

The inventive network architecture is based on an entity called a multicast switch (MSW) which can be thought of as an ATM switch with IP multicast routing capabilities. The idea is to have one MSW per LIS which serves the dual purpose of aggregating outside senders for local receivers and aggregating outside receivers for local senders. In this sense, an MSW is similar to a multicast router, but it has additional features that make it a more attractive option for supporting inter LIS multicast. First, unlike multicast routers which sit at LIS boundaries (i.e. between LISs), an MSW is a part of exactly one LIS. Structuring MSWs and LISs in this manner is more in line with the way ATM networks are organized where a bunch of end systems (hosts) connect to an ATM switch using a User Network Interface (UNI). Second, an MSW is capable of establishing direct VCs to other MSWs in the ATM cloud using ATM signaling, thus providing shortcut routing for inter LIS multicast traffic. Third, an MSW can support receiver heterogeneity within an LIS based on the local policy and availability of resources. The following discussion first describes the overall network architecture and the functionality of a multicast switch. Thereafter, the protocol operation of IP multicast and RSVP in the inventive network architecture is described.

Figure 2:
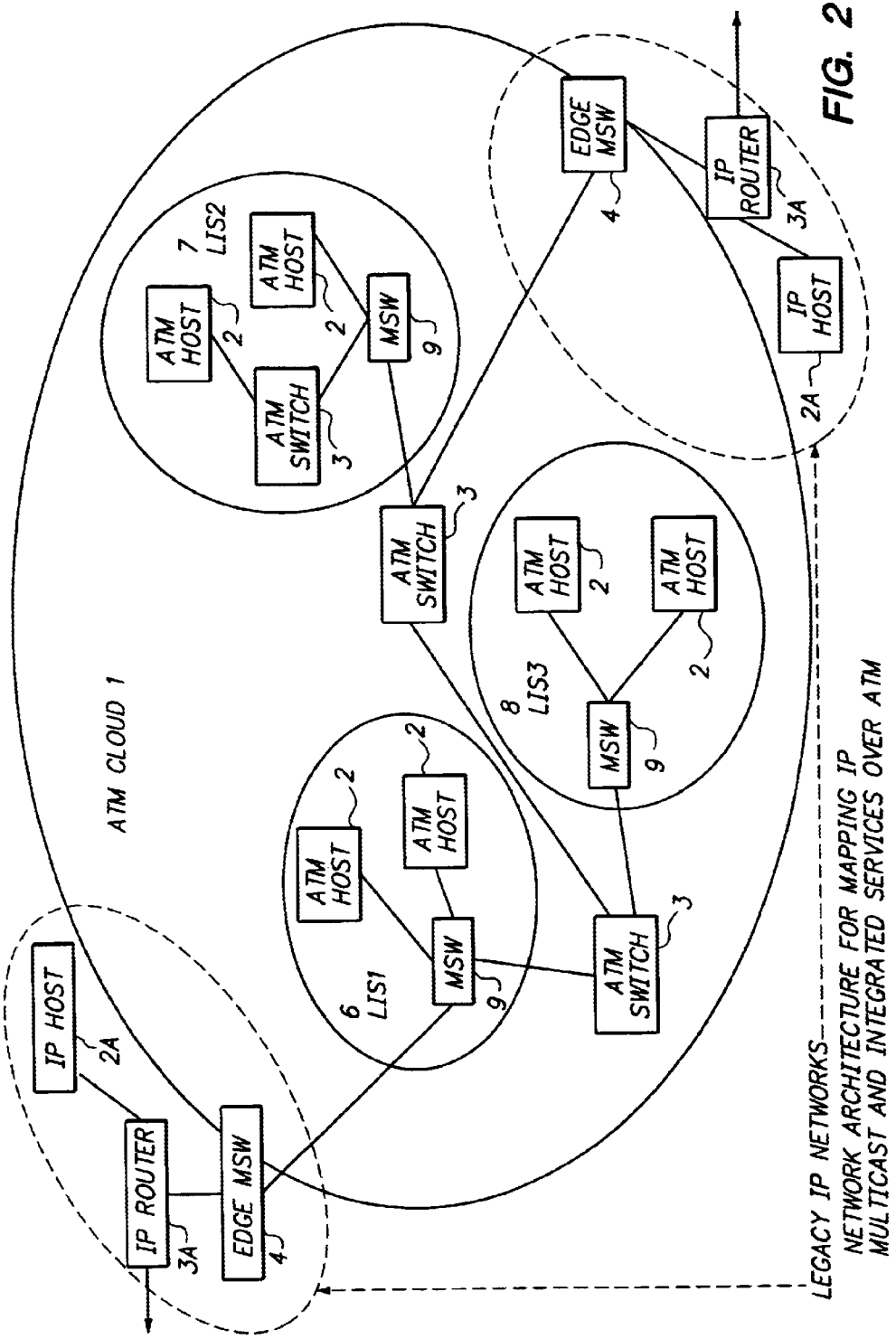
FIG. 2 shows a network architecture for mapping IP multicast and Integrated Services over ATM in accordance with the present invention.

As stated above, the inventive network architecture is constituted by one multicast switch (MSW) per LIS in an ATM cloud. An MSW is an ATM switch which also runs multicast routing software in addition to supporting PNNI and UNI. Each MSW aggregates multicast receivers in its LIS for the outside world. An MSW also serves as a multicast server (MCS) for its LIS. A multicast server in an ATM network allows aggregation of traffic from multiple senders that can be sent out on a single VC to the receivers. An MSW is also capable of processing RSVP control messages and performing call admission control (CAC) for RSVP flows. On the edges of the ATM cloud, border or edge MSWs help to aggregate multicast receivers inside the ATM cloud for outside senders and vice versa. An example network architecture is shown in FIG. 2. The figure shows an ATM cloud 1 that consists of three LISs (6, 7, 8). LIS 6 and LIS 8 each have a single ATM switch that is also designated as the MSW 9 for its LIS. LIS 7 has two ATM switches, one of which is designated as the MSW 9, while the other ATM switch 3 does not participate in IP multicasting or RSVP operation.

It is assumed that each multicast switch (MSW) 9 can communicate with all other MSWs in the ATM cloud using a point-to-multipoint VC. Such VCs among MSWs can be established using UNI signaling. If the ATM cloud is too large, thereby making point-to-multipoint VCs among MSWs impractical, a hierarchy of MSWs similar to the PNNI hierarchy (See Private network-network interface specification version 1.0 (PNNI 1.0), The ATM Forum Technical Committee, March 1996.) may be needed to cover the entire cloud. In such a case, a group of MSWs will choose a group leader among themselves to represent them in the next higher level group. A multicast routing scheme, albeit only for best effort multicast, using a PNNI hierarchy is described in R. Venkatswaran et al., Hierarchical multicast routing in wide-area ATM networks, Proc. Of the Intl. Communications Conf. (ICC '96), June, 1996.

Multicast Switch (MSW)

FIG. 3 shows the architecture of a multicast switch (MSW) 9. The MSW is constituted by switch hardware and a switch controller 10 that can establish VC translation tables for cell forwarding. Various other components shown in the figure are described as follows. The RSVP message handler 11 terminates RSVP messages from other MSWs in the ATM cloud, local ATM hosts and external IP routers. The message handler also executes the RSVP protocol maintaining soft state for each RSVP flow passing through the switch. When resource reservations for a new flow are received by the RSVP handler, the RSVP message handler consults the call admission control (CAC) function 12 to decide if enough resources can be reserved for the new flow. If so, the RSVP message handler requests the VC management function 13 to take appropriate action for establishing intra and inter LIS VCs for the new flow. The VC management function makes use of UNI signaling function 13a to establish intra and inter LIS VCs. UNI signaling is used even for inter LIS VCs among MSWs since these VCs are terminated by the MSWs. The VC management function also makes use of a VC concatenation function 13b that can concatenate two existing VCs that are currently terminated by the MSW, into one VC. VC management is discussed later in detail.

The multicast routing component 14 of the multicast switch consists of three parts. The first part 14a is responsible for maintaining group membership information for the LIS. Such information may be supplied by the local multicast address resolution server (MARS). See G. J. Armitage, Support for multicast over UNI 3.0/3.1 based ATM networks, Request for comments 2022, November 1996. The second part 14b is responsible for communicating with its peer functions running on other MSWs in the ATM cloud. This part exchanges summarized local membership information with other MSWs. This information is used by MSWs to establish best effort and QoS based multicast trees among MSWs as explained later. The third part 14c of the multicast routing component 14 provides an Inter Domain Multicast Routing (IDMR) Protocol interface to IP routers located outside the ATM cloud. This interface consists of multicast routing code for each IDMR protocol supported and interacts with external routers, sending them multicast routing and membership information about the ATM cloud and receiving from them similar information about external networks. The IDMR interface is needed only on edge MSWs 4, shown in FIG. 2, since internal MSWs 9 do not communicate directly with outside routers.

The steps performed in the network which enable mapping IP multicast and Integrated Services over ATM networks will now be described.

1. Control VCs for RSVP Messages

Referencing FIG. 4, all the MSWs in an ATM cloud 1 (or a PNNI domain) initially form a mesh of point-to-multipoint control VCs 15 among themselves—one such VC is rooted at each MSW 9 with all other MSWs as its leaves. FIG. 4 shows a VC rooted at MSW2, with MSW1 and MSW3 as its leaves. Other VCs, (not shown for the sake of simplicity) are rooted at MSW1 and MSW3, respectively. These control VCs are used by the MSWs 9 to forward group membership information about their respective LISs to other MSWs. Edge MSWs 4 also forward group membership information learned from outside networks to other MSWs. This information is used by each MSW 9 to determine the set of MSWs that need to receive multicast data originating from any local sender for each multicast group. The control VCs 15 are also used by MSWs 9 to propagate PATH messages originating from senders within their LISs.

RESV messages originating at multicast receivers within an LIS and directed towards a multicast sender are aggregated into a single RESV message by the MSW in the LIS containing the receivers, which is then forwarded to the MSW in the LIS containing the sender. Additional point-to-point control VCs may be created for this purpose by the MSWs as required. Control VCs (both point-to-point and point-to-multipoint) are created with reasonable QoS parameters that reflect the amount of traffic expected on such VCs.

Propagation of control messages from an MSW to the multicast receivers within its LIS is handled using a separate point-to-multipoint control VC 16. This intra LIS control VC 16 is rooted at the MSW 9 and every multicast receiver in the LIS 6, 7, 8 is added to the control VC 16 as a leaf node when it first registers as a receiver with the local MARS for any multicast group. The intra LIS control VC is used to distribute PATH messages from local and outside senders to local receivers. For sending RESV messages back to the MSW, multicast receivers use individual point-to-point control VCs as needed. FIG. 4 shows local control VCs 16 in each LIS 6, 7, 8 and also the inter LIS control VC 15 rooted at MSW2 9 in LIS 7. Similar inter LIS control VCs rooted at other MSWs are not shown for purposes of simplicity, through the concept just described is equally applicable.

2. Multicasting Within an LIS

Given the network architecture described above, once the control VCs are established, multicast forwarding within each LIS is performed as follows. A Multicast Address Resolution Server (MARS) is employed in each LIS to resolve an IP multicast address to ATM addresses of the receivers that have joined the group represented by the multicast address.

Figure 5:
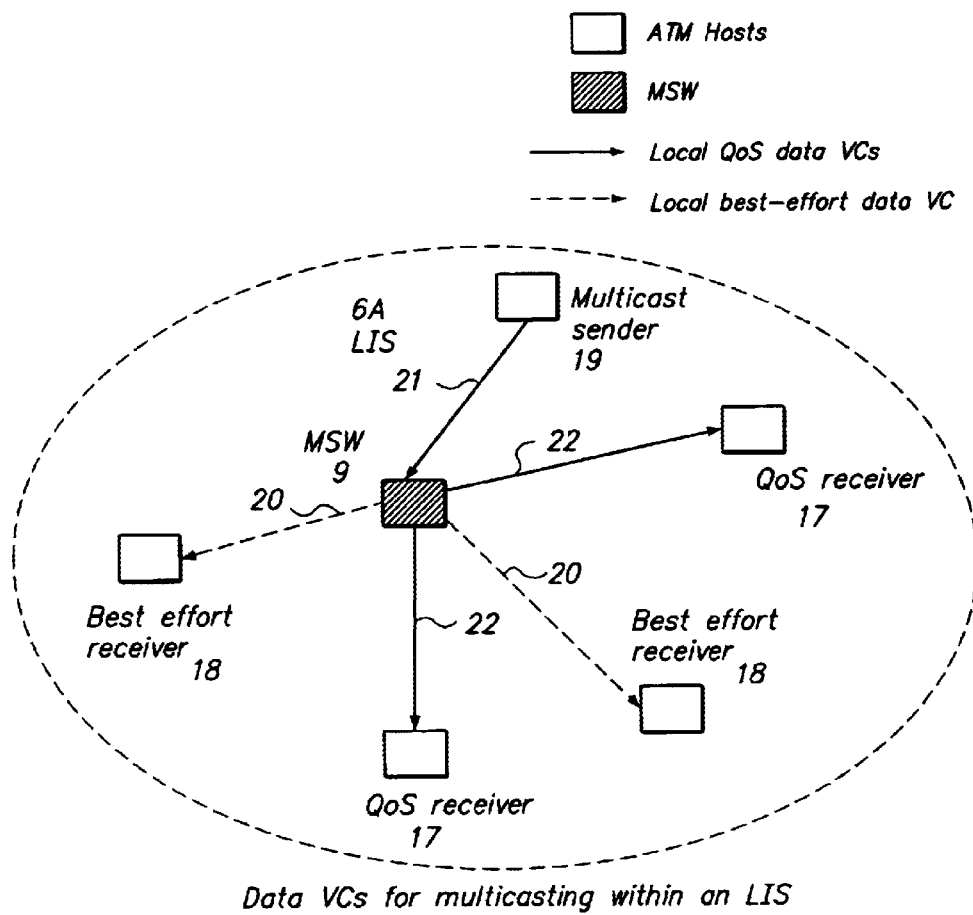
FIG. 5 shows data VCs for multicasting within an LIS.

Referencing FIG. 5, in a simple multicasting scenario within an LIS 6A, receivers 17, 18 that are ATM hosts, and that wish to join a multicast group first register with the local MARS (not shown), supplying their ATM addresses and the address of the multicast group. The MSW 9 also registers with the local MARS as a promiscuous receiver and a multicast server (MCS) for all IP multicast addresses. A multicast sender 19 in the LIS registers as a sender with the local MARS giving its own ATM address and the IP multicast group address to which it wishes to send data. The MARS returns the ATM address of the MSW 9 as the sole receiver of the multicast since the MSW 9 is also the multicast server for the LIS 6A. The sender 19 then proceeds to establish a best effort point-to-point VC (not shown) with the MSW 9 and starts sending multicast data on this VC. The MSW 9 in turn obtains the list of ATM hosts 17, 18

(receivers) that have registered with the MARS as members of the multicast group to which the sender is sending data and establishes best effort point-to-multipoint data VCs 20 to those hosts. Multicast data received from the sender 19 is forwarded on these VCs 20 using shortcut routing. Any changes in the multicast group membership are communicated to the MSW 9 by the MARS. On receiving these changes, the MSW 9 adds leaf nodes to or removes leaf nodes from the point-to-multipoint best effort data VC 20 as appropriate.

The MSW also forwards data packets received from the sender to other LISs as explained later. To enable QoS based multicast in the LIS using RSVP, the sender 19 sends a PATH message to the MSW 9 on a separate control VC (not shown) which is forwarded by the MSW 9 to the local receivers 17, 18 on the intra LIS point-to-multipoint control VC (not shown). In response, local receivers 17 desiring QoS based multicast send RESV messages to the MSW 9 on individual control VCs (not shown) indicating their resource requirements. An aggregate RESV message summarizing the RESV messages from local receivers is sent to the sender 19 by the MSW 9. The sender then establishes another VC 21 to the MSW 9 with QoS parameters derived from the aggregate RESV message and starts sending multicast data on the new VC 21. The old best effort data VC from the sender to the MSW 9 is deleted. The MSW 9 also establishes a new QoS based point-to-multipoint VC 22 to the local receivers 17 that had requested QoS service. These receivers are dropped from the best effort data VC 20, although the best effort VC 20 is left operational to serve best effort receivers 18. The incoming QoS VC 21 from the sender is concatenated to the two outgoing point-to-multipoint VCs 20, 22 (best effort and QoS based) by the MSW to ensure shortcut forwarding of data within the LIS.

Using the MSW as a multicast server (MCS) has two advantages. First, multicast senders are relieved from the burden of managing the VC endpoints which keep changing due to receivers subscribing to or dropping off from the multicast group. Second, the MSW can support various features such as receiver heterogeneity, sender aggregation, shortcut routing etc. based on the availability of resources and locally configured policy.

3. Multicasting Aross LIS Boundaries

Just like an IP multicast router, an MSW aggregates receivers within its LIS for outside senders and outside receivers for local senders. Unlike multicast routers, however, MSWs allow shortcut multicast forwarding both within and between LISs with minimal routing support. An inter LIS multicast tree is initially formed as a best effort point-to-multipoint VC rooted at an MSW that has a local sender, with other MSWs that have local receivers forming the leaf nodes. Local VCs created for multicast distribution within each LIS are then concatenated to this inter LIS tree thus forming the complete multicast tree. One such tree may be formed for each sender, although it may be possible to aggregate traffic from multiple senders on a single tree as well.

To initiate QoS based multicast, a sender starts sending PATH messages to its local MSW. These PATH messages are forwarded over the intra and inter LIS control VCs by the sender's MSW. Other MSWs, on receiving the PATH messages from the sender's MSW, also forward them within their respective LISs. On receiving PATH messages, receivers can signal their resource requirements by sending RESV messages to their respective MSWs. MSWs combine the resource reservation requests from their local receivers and send an aggregate RESV message to the sender's MSW. The sender's MSW collects RESV requests from other MSWs and its local receivers and forwards an aggregate request to the sender. On receiving a RESV request from the local MSW, a sender can upgrade its local data VC with the MSW to one with a QoS large enough to satisfy the resource reservations of all known receivers. After this, the MSW, in addition to establishing a QoS tree within its LIS as mentioned earlier, upgrades the inter LIS best effort point-to-multipoint data VC with other MSWs to one with a QoS large enough to satisfy the QoS requirements of all the receivers. QoS parameters for the inter LIS data VC can be obtained from the traffic specification (Tspec) parameters in a sender's PATH message. Subsequently each MSW that is a leaf node on the inter LIS data VC also establishes one or more point-to-multipoint QoS VCs within its LIS for data distribution to QoS receivers. Unlike the intra LIS case where multiple local data VCs may be established for best effort and QoS receivers, the inter LIS multicast forwarding uses just one QoS VC. Thus any amount of receiver heterogeneity needed is supported only within individual LISs. A detailed example of RSVP operation covering inter LIS multicast is given later.

4. Resource Reservation

Reservations among MSWs are handled using ATM signaling protocols thus allowing the ATM network to best manage the QoS and the path for MSW-to-MSW point-to-multipoint VCs. Such reservations are established by the MSW representing a sender's LIS at the time of creating the point-to-multipoint data VC to other MSWs. As more receivers join in, additional MSWs can be added to the point-to-multipoint VC using leaf-initiated joins. Local (intra LIS) reservations are also handled by the MSW and local senders using ATM signaling according to the local policies regarding the amount of heterogeneity to be supported.

5. RSVP Soft State and VC Teardown

RSVP soft state is maintained by the RSVP handler function of each MSW as stated earlier. RSVP requires routers to monitor RSVP flows using inactivity timers and discard the state for flows that have not seen any traffic for a configured amount of time. MSWs in the inventive scheme have more than just the flow related soft state to maintain since they also manage intra and inter LIS VCs. The RSVP handler function at the MSWs is responsible for periodically monitoring the activity on RSVP flows. For active flows, senders and receivers should periodically send PATH and RESV messages respectively, but the absence of such messages for a configured amount of time may necessitate the RSVP handler to query the switch hardware for the status of the data traffic on the flow. If the reply from the switch hardware confirms that the flow in question has been inactive for a period in excess of the configured timeout, the state for that flow is discarded and any associated VCs are cleared.

6. Multiple Senders and RSVP Reservation Styles

More than one sender can send data traffic to the same IP multicast group address at a given time. RSVP allows individual receivers to associate a filter with each requested reservation. This filter indicates whether the reservation applies to data sent by one sender (fixed filter), a list of senders (shared explicit filter) or all current and future senders (wild card filter).

The network architecture described here builds a separate multicast tree (consisting of intra and inter LIS VCs) for each multicast sender by default. This is ideal if all multicast receivers in the ATM cloud have requested the fixed filter style since each MSW receives data originating at different senders on separate VCs. Support for the other two styles can also be provided using one of the following two methods:

i) Separate intra LIS VCs can be maintained for each sender by the MSW and a local receiver can be added to one or more of such VCs depending on the number of genders that match the filter style requested by the receiver.

ii) Each MSW can partition the multicast receivers in its LIS into different groups depending upon the filter style and QoS parameters requested by the receivers. Receivers that have requested similar QoS parameters and the same list of senders can be put in one group. Next, each such group can be added on a different intra LIS data VC. In this manner, receivers that have requested a wild card filter (and similar QoS parameters) will be put on one data VC. Similarly, receivers that have explicitly requested different sets of (one or more) senders will be put on different data VCs.

An MSW can be configured by the network administrator to use either of the above methods.

7. External Senders

As mentioned earlier, the inner (non-edge) MSWs in the network architecture described here do not have an IDMR (inter domain multicast routing) interface. This is because such MSWs do not need to run a full fledged IP multicast routing protocol. The only information needed for establishing inter LIS VCs, which is about the existence of senders and receivers in each MSW's LIS, is exchanged among MSWs using control VCs. Furthermore, information needed for establishing intra LIS VCs is available to each MSW from its local MARS. Given this information, MSWs can establish a multicast tree for each sender within the ATM cloud.

If a multicast group has an outside sender however, the traffic originating at such a sender can reach more than one edge MSW. If each such edge MSW creates a multicast tree within the ATM cloud, there may be multiple trees created (by different edge MSWs) for the same sender. Since the inner MSWs do not run a full fledged IP multicast routing protocol, they cannot select one edge switch over the other as their immediate source of multicast data. This can result in multiple copies of data packets being forwarded to the receivers in the ATM cloud, which is clearly undesirable. To prevent duplication of multicast data within the ATM cloud, all edge MSWs in an ATM cloud cooperate with each other to partition the outside senders amongst themselves. After such partitioning, for a given outside sender, there is exactly one edge MSW which forwards the data originating at that sender into the ATM cloud. This edge MSW is the only one that initiates the creation of inter and intra LIS VCs in the ATM cloud for the outside sender. In this respect, the edge MSWs act in a manner similar to multicast routers on a shared network in Distance Vector Multicast Routing Protocol (See D. Waitzman, et al., Distance Vector Multicast Routing Protocol, Network Working Group, Request for Comments 1075, November, 1988), where exactly one router is chosen to forward multicast data into the shared network for a given multicast source. For the edge MSWs, the whole ATM cloud constitutes the shared network.

Example of RSVP Operation

Figure 6:
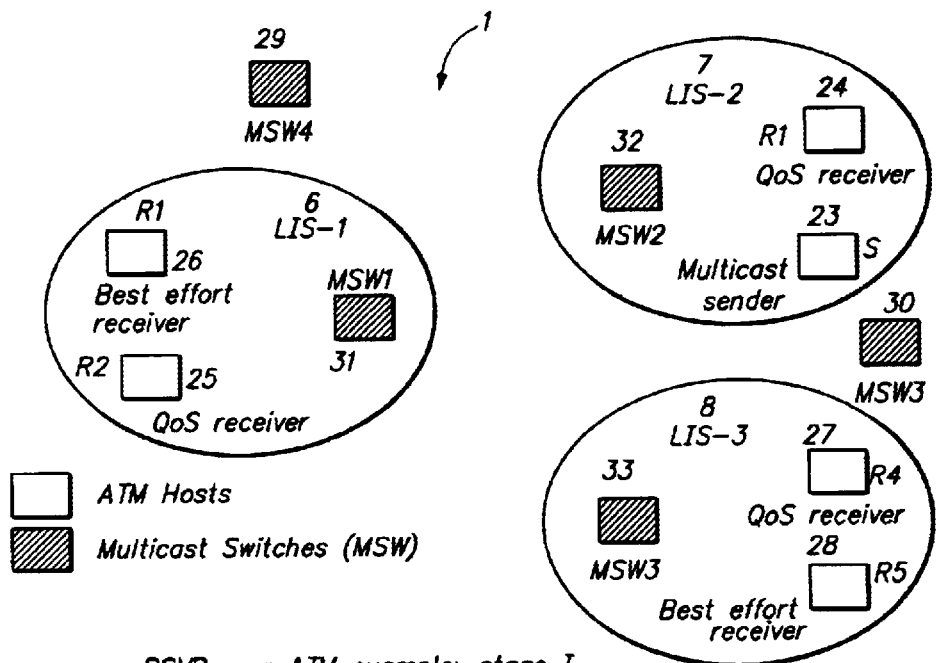
FIG. 6 shows stage I of an example of RSVP over ATM.

An example of RSVP operation in the inventive network architecture will now be described, with reference to an ATM cloud 1 with 3 LISs as shown in FIG. 6. In stage I of the example operation, as shown in FIG. 6, there are no data VCs established in the ATM cloud. Although intra and inter LIS control VCs must be established before RSVP operation can take place, such VCs are omitted from the figure for clarity. The exemplary multicast session has one sender S 23 located in LIS2 7. A total of three receivers 24, 25 and 27 intend to receive the data sent by S 23 with a certain QoS (assume for the sake of simplicity that all three intend to request the same QoS parameters). Further, receivers 26 and 28 intend to receive the multicast data without any QoS reservations, i.e. with best effort protocols. In addition, there are RSVP receivers outside the ATM cloud 1 (not shown in the figure) that wish to receive the multicast traffic originating at the sender S 23 via two edge MSWs (MSW4 and MSW5) 29, 30.

Figure 7:
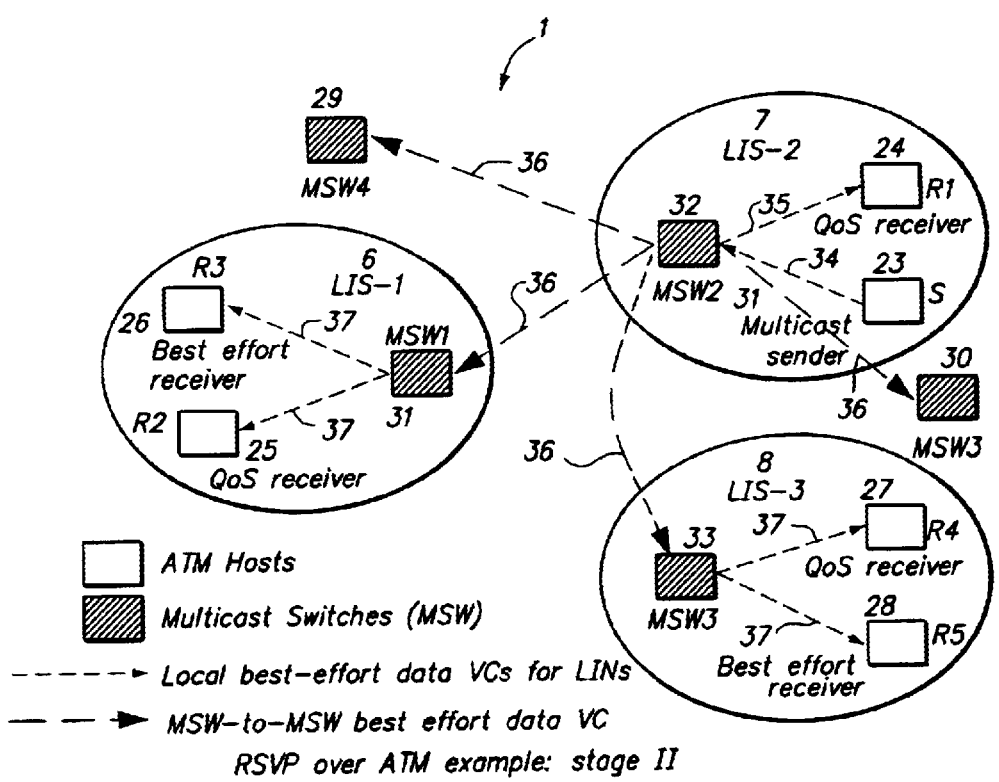
FIG. 7 shows stage II of an example of RSVP over ATM.

Turning now to FIG. 7, the sender S 23 first establishes a best effort VC 34 to MSW 32 which in turn establishes a best effort VC 35 to the QoS receiver 24. When receivers in other LISs both within and outside the ATM cloud 1 join the multicast group to which S 23 is sending data, MSW 32 receives membership updates from the respective MSWs (e.g. 29, 30, 31, 33) indicating the presence of local receivers in their LISs. MSW 32 proceeds to build a point-to-multipoint best effort VC 36 to the MSWs (e.g. 29, 30, 31, 33) that have local receivers. These MSWs (e.g. 29, 30, 31, 33) establish best effort VCs 37 in their respective LISs for distributing multicast traffic to local receivers (e.g. 25–28). All the MSWs 29–33 then concatenate the intra and inter LIS best effort VCs 34–37 to create a shortcut path from the sender S 23 to all the multicast receivers. FIG. 7 shows the multicast tree established in this manner, which is stage II in the example.

To initiate QoS operation, the sender S 23 sends a PATH message to MSW 32 describing its traffic characteristics. This PATH message is distributed over intra and inter LIS control VCs (not shown) by MSW 32. When other MSWs (e.g. 31, 33) receive this PATH message, they in turn distribute it within their respective LISs (e.g. 6, 8). Edge MSWs (e.g. 29, 30), also forward the PATH message to external networks. After receiving the PATH message, receivers 24, 25 and 27 indicate their desire to receive QoS traffic by sending RESV messages to their respective MSWs 32, 31 and 33, respectively. Assume that some receivers outside the ATM cloud 1 that are reachable via MSW 29 and MSW 30 also request QoS traffic using RESV messages which eventually reach MSW 29 and MSW 30. Each MSW (including every edge MSW) that has QoS receivers within its LIS (or downstream from it) sends an RESV message to MSW 32 using a separate point-to-point control VC (not shown) summarizing the resource reservations requested by receivers in their respective LISs. Following this, MSW 32 sends an aggregate RESV message to S 23 indicating the reservation needed for the point-to-point VC between S 23 and itself.

Figure 8:
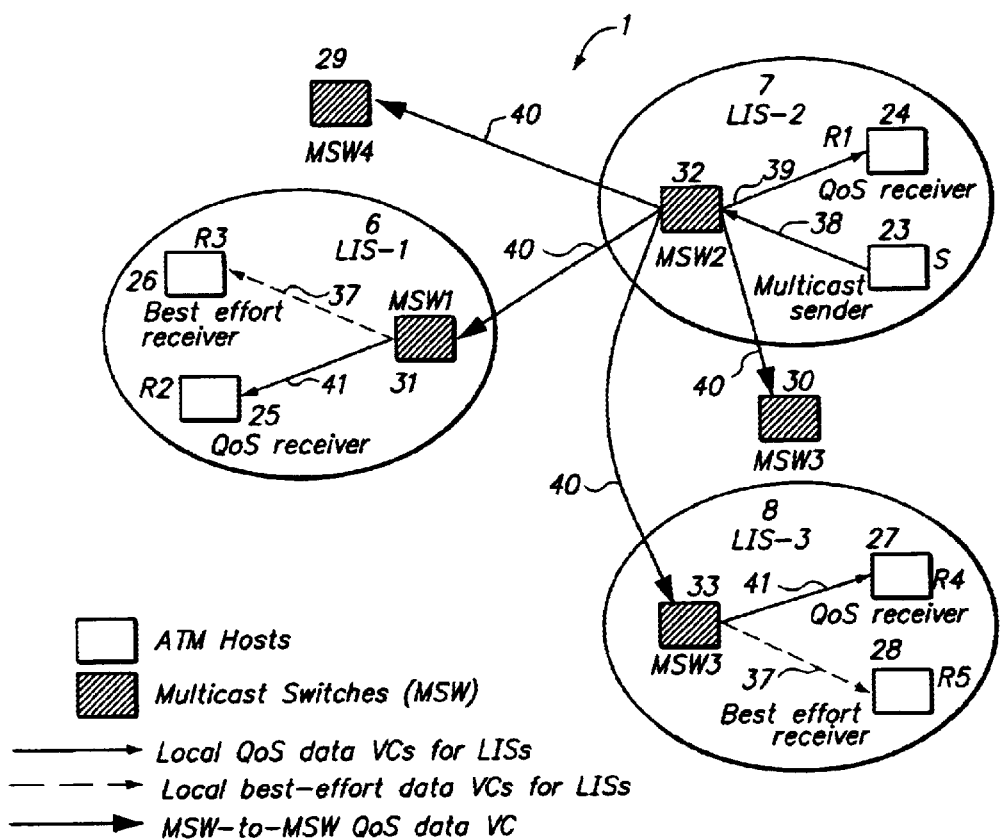
FIG. 8 shows stage III of an example of RSVP over ATM.

Turning to FIG. 8, after receiving the RESV message from MSW 32, the sender S 23 establishes a QoS VC 38 to MSW 32 and starts sending the multicast traffic over the new VC 38. S 23 also deletes the existing best effort VC (34 in FIG. 7). MSW 32 establishes a QoS VC 39 to the QoS receiver 24 and drops receiver 24 from the existing best effort VC (35 in FIG. 7). MSW 32 also upgrades the best effort VC (36 in FIG. 7) for inter LIS data distribution to a QoS VC 40 with QoS parameters large enough to support any of the requested reservations. There is no need to keep the existing inter MSW best effort VC (36 in FIG. 7) as MSWs that only have best effort receivers can receive data from MSW 32 on the QoS VC 40 and distribute it locally over best effort VCs 37. The existing inter LIS best effort VC (36 in FIG. 7) is therefore discarded and the QoS VC 40 is used for inter LIS data forwarding thereafter. After the inter MSW VC 40 is established, MSW 31 and MSW 33 establish QoS data VCs 41 in their respective LISs 6, 8 to receivers that had requested QoS traffic 25, 27. The QoS receivers 25, 27 are also dropped from the existing best effort VCs (37 in FIG. 7), although best effort VCs may still be needed for best effort receivers. MSW2 32 concatenates the incoming QoS VC 38 from the sender S 23 to the outgoing inter and intra LIS VCs 39, 40. Other MSWs concatenate the incoming inter LIS VC 40 to one or more outgoing intra LIS VCs 37, 41, thus providing a shortcut path from the sender to all multicast receivers (both QoS and best effort). The final VC setup (stage III) is shown in FIG. 8.

Supported Features

The network architecture for mapping IP multicast and Integrated Services over ATM just described supports a variety of features.

First, receiver heterogeneity, i.e. allowing different receivers in the same multicast session to receive data with different reservations, can be supported by an MSW in many forms including the modified homogeneity approach recommended in Crawley et al., A Framework for Integrated Services and RSVP over ATM, Internet Engineering Task Force, Internet Draft, <draft-ietf-issll-atm-framework-00.txt>, Jul. 24, 1997. Receiver heterogeneity is supported only within LISs where it can be easily controlled by local policy and availability of resources. It is possible to support full heterogeneity, i.e. distinct QoS VCs for receivers with different reservations, provided sufficient resources are available. The number of distinct VCs to be supported for a given multicast address can thus be tied to the amount of available resources such as buffer space and VC numbers at the local MSW etc. Supporting receiver heterogeneity at the MSW may require different queues and algorithms to manage these queues for different outgoing VCs if they are being fed from a single incoming VC. It is desirable to have this capability in ATM switch hardware, although it is always possible to support receiver heterogeneity in software by reassembling an incoming packet and transmitting it over several outgoing VCs with different QoS. Supporting receiver heterogeneity only at the LIS level saves the trouble of establishing and maintaining multiple multicast trees (one for each QoS class requested) for the same session that may potentially span the whole ATM cloud. Consequently, there is no need to send duplicate copies of data packets over multiple VCs between MSWs. Instead, message duplication if any, is confined within the LIS boundaries. As a matter of fact, if an LIS consists of just one ATM switch (which must be the MSW), only one copy of data is forwarded on any ATM link even with full receiver heterogeneity since the link between an ATM host and its switch is a point-to-point link and not a shared network.

Second, shortcut routing from a multicast sender to all the receivers in the ATM cloud can be accomplished by simply concatenating the following separate VCs—i) the point-to-point VC from the sender to its local MSW, ii) the point-to-multipoint inter LIS VC from the sender's MSW to other MSWs that have local receivers, and iii) the point-to-multipoint VCs between the MSW and local receivers in each LIS that has multicast receivers. An MSW can concatenate the VCs in this manner after receiving a VC setup request from the upstream direction (another MSW or a local sender) and initiating a VC setup in the downstream direction (to other MSWs or local receivers). Alternatively, the concatenation can be performed when the first data packet traverses through the MSW on the routed path in a way similar to IP switching schemes. Using VC concatenation for shortcut routing and direct VCs for inter MSW data and control traffic ensures shortcut routing from a sender to all the receivers in the ATM cloud. At the same time this arrangement makes sure that RSVP control messages traverse the same path as data (although not the same VC) thus allowing RSVP PATH messages to correctly accumulate path characteristics from a sender to the receivers.

Third, edge MSWs on the border of the ATM cloud ensure interoperation with Inter Domain Multicast Routing (IDMR) protocols that may be in use outside the ATM cloud. An edge MSW behaves as any other MSW within the ATM cloud—in fact it may even support its own LIS of ATM hosts. In addition, an edge MSW also runs appropriate multicast routing software to correctly interoperate with the routing protocol being used on its non-ATM side.

Fourth, RSVP allows receivers to change their QoS reservations at any time even after a multicast session has been established. It is somewhat difficult to support dynamic QoS in ATM networks, however, since neither UNI 4.0 nor PNNI currently supports changing QoS parameters once a VC has been established. The only possible way to change QoS for an existing data VC in the ATM network is to establish a new VC with the modified QoS parameters and migrate traffic from the old VC to the new one. For a sufficiently large multicast tree, such changes can be quite costly since many of the requested QoS changes will propagate beyond the LIS of the receiver that requested the QoS change. In the inventive scheme, which has separate VCs for intra and inter LIS traffic, most requests for changing QoS can be accommodated locally, i.e. within the LIS of the host that requested the change, because the inter LIS data VC for a given data flow is established with a sufficiently large QoS so that it can accommodate a whole range of QoS requests from individual receivers. Requests for changes in QoS by local receivers may thus cause establishment of additional VCs (and possibly removal of old VCs) to support the new QoS but such changes will be limited to the LIS.

Although the present invention has been described with reference to a specific embodiment, many modifications and variations therein will be readily apparent to those of working skill in this technological field. Accordingly, all such variations and modifications are included within the scope of the present invention as defined by the following claims.

What is claimed is:

1. A method for mapping quality of service based internetworking protocol (IP) multicast in a network architecture, said IP multicast supporting at least one multicast group, said network architecture comprising an asynchronous transfer mode (ATM) cloud including a plurality of logical IP subnets, a plurality of multicast switches and a plurality of local ATM hosts, said multicast switches communicating using ATM protocols, wherein one of said plurality of multicast switches is located in each of said logical IP subnets and at least one of said local ATM hosts is located in each of said logical IP subnets, said method comprising the steps of:

forming an intra logical IP subnet control tree in each of said logical IP subnets for communication between said multicast switches and said ATM hosts;

forming an inter logical IP subnet control tree for providing shortcut routing for inter logical IP subnet multicast traffic; and for each of said at least one multicast group, forming a best effort point to point data virtual circuit between one of said ATM hosts sending multicast data and one of said multicast switches located in one of said logical IP subnets in which said one of said ATM hosts sending multicast data is disposed;

forming a best effort intra logical IP subnet data tree in each of said logical IP subnets;

forming a best effort inter logical IP subnet data tree, wherein said best effort inter logical IP subnet data tree may be concatenated with said best effort intra logical IP subnet data trees, thereby forming shortcuts through said multicast switches for routing inter logical IP subnet multicast traffic;

upgrading at least one branch of at least one of said best effort intra logical IP subnet data trees in said logical IP subnets to be a quality of service intra logical IP subnet data tree for transmitting multicast data;

upgrading said best effort inter logical IP subnet data tree to a quality of service inter logical IP subnet data tree for transmitting multicast data;

concatenating said quality of service intra logical IP subnet data trees with said quality of service inter logical IP subnet data tree and any remaining of said best effort intra logical IP subnet data trees, thereby forming a quality of service based multicast tree.

2. The method according to claim 1, wherein said step of forming an intra logical IP subnet control tree in each of said logical IP subnets comprises:

establishing point to multipoint control virtual circuits within each of said logical IP subnets using ATM signaling, between said multicast switches and said local ATM hosts disposed in each of said logical IP subnets.

3. The method according to claim 1, wherein said step of forming an inter logical IP subnet control tree further comprises:

establishing point to multipoint control virtual circuits between said multicast switches located in each of said logical IP subnets using ATM signaling.

4. The method according to claim 3, further comprising the steps of:

each of said multicast switches determining, using group membership information regarding said at least one multicast group, a specific set of others of said multicast switches needing to receive multicast data originating from any of said local ATM hosts sending multicast data for each of said at least one multicast group.

5. The method according to claim 1, wherein said step of forming a best effort intra logical IP subnet data tree comprises:

determining sets of said local ATM hosts in said logical IP subnets as being members of one of said at least one multicast group;

establishing best effort point to multipoint data virtual circuits within each of said logical IP subnets for each of said at least one multicast group using ATM signaling from a respective one of said multicast switches in each of said logical IP subnets to each of said local ATM hosts which are determined to be members of said one of said at least one multicast group.

6. The method according to claim 5, wherein said ATM cloud further comprises a plurality of multicast address resolution servers, at least one of said multicast address resolution servers being located in each of said logical IP subnets, said step of determining sets further comprising the steps of:

registering ones of said ATM hosts receiving multicast data with said multicast address resolution servers when said ones of said ATM hosts receiving multicast data wish to join one of said at least one multicast group, said multicast address resolution servers resolving an IP multicast address to an ATM address for each of said ones of said ATM hosts receiving multicast data, and registering said multicast switches with said multicast address resolution servers as promiscuous receivers and as multicast servers for all IP multicast addresses.

7. The method according to claim 6, wherein one of said ATM hosts sending multicast data registers as a sender with one of said multicast address resolution servers located in one of said logical IP subnets containing said sender, said sender providing said sender's ATM address and one of said IP multicast addresses to which said sender wishes to send said multicast data, said one of said multicast address resolution servers returning an ATM address of said one of said local multicast switches located in said one of said logical IP subnets containing said sender as a sole receiver of said one of said at least one multicast group.

8. The method according to claim 7, wherein additional ones of said ATM hosts sending multicast data begin sending multicast data to one of said at least one multicast group, thereby allowing said one of said ATM hosts sending multicast data and said additional ones of said ATM hosts sending multicast data to send said multicast data to a single IP multicast group address at a given time.

9. The method according to claim 6, wherein changes in membership of said one of said at least one multicast group are communicated to said multicast switches by said multicast address resolution servers, said multicast switches adding and removing virtual circuits to said ones of said ATM hosts receiving multicast data according to said changes in membership of said one of said at least one multicast group.

10. The method according to claim 1, wherein said step of forming a best effort inter logical IP subnet data tree further comprises:

forwarding group membership information regarding said at least one multicast group from each of said multicast switches regarding its logical IP subnet to others of said multicast switches;

each of said multicast switches determining, using said group membership information, a specific set of others of said multicast switches needing to receive multicast data originating from any of said local ATM hosts sending multicast data; and establishing a best effort point to multipoint data virtual circuit from said one of said multicast switches disposed in one of said logical IP subnets containing one of said ATM hosts sending multicast data to others of said multicast switches disposed in said logical IP subnets containing ones of said ATM hosts receiving multicast data using ATM signaling.

11. The method according to claim 1, further comprising the steps of:

after said step of forming a best effort inter logical IP subnet data tree, transmitting a source description control message from said one of said ATM hosts sending multicast data, over a first point to point control virtual circuit established between said one of said ATM hosts sending multicast data and said one of said multicast switches located in said one of said logical IP subnets in which said one of said ATM hosts sending multicast data is disposed;

forwarding said source description control message from said multicast switch in said logical IP subnet of said one of said ATM hosts sending multicast data to others of said multicast switches over said inter logical IP subnet control tree; and said others of said multicast switches forwarding said source description control message over said intra logical IP subnet control tree to others of said ATM hosts receiving multicast data.

12. The method according to claim 11, further comprising the steps of:

after said step of others of said multicast switches forwarding said source description control message, said multicast switches receiving quality of service resource reservation request control messages over second ones of point to point control virtual circuits, from ones of said ATM hosts receiving multicast data and desiring quality of service based multicast in said logical IP subnets, wherein each of said messages is capable of indicating a different quality of service, said multicast switches aggregating said quality of service resource reservation request control messages, forming aggregate quality of service resource reservation request control messages, said quality of service resource reservation request control messages indicating resource requirements from said ones of said ATM hosts receiving multicast data; and said multicast switches transmitting said aggregate quality of service resource reservation request control messages over third ones of point to point control virtual circuits to said multicast switch in said logical IP subnet of said one of said ATM hosts sending multicast data, said third ones point to point control virtual circuits being formed for transmitting said aggregate quality of service resource reservation control messages, said one of said multicast switches aggregating and forwarding said quality of service resource reservation request control messages to said one of said ATM hosts sending data, over said first point to point control virtual circuit.

13. The method according to claim 12, wherein said quality of service resource reservation control messages are used in said step of upgrading said at least one branch of at least one of said best effort intra logical IP subnet data trees.

14. The method according to claim 12, further comprising the step of:

upgrading said best effort point to point data virtual circuit to a quality of service point to point data virtual circuit, wherein said aggregate quality of service resource reservation control messages are used in said step of upgrading said best effort inter logical IP subnet data tree and said step of upgrading said best effort point to point data virtual circuit.

15. The method according to claim 14, wherein quality of service parameters of said quality of service inter logical IP subnet data trees are sufficiently large to accommodate one of said quality of service resource reservation request control messages having a largest quality of service requirement.

16. The method according to claim 12, further comprising the steps of:

transmitting new quality of service resource reservation request control messages from ones of said receivers to respective ones of said multicast switches to change said quality of service based multicast tree;

changing at least some branches of said quality of service intra logical IP subnet data trees to new quality of service intra logical IP subnet data trees for transmitting multicast data using ATM signaling, said upgrading being based on said new quality of service resource reservation request control messages; and concatenating said new quality of service intra logical IP subnet data trees with said quality of service intra logical IP subnet data trees, said quality of service inter logical IP subnet tree and said any remaining of said best effort intra logical IP subnet data trees, thereby forming a new quality of service based multicast tree.

17. The method according to claim 12, further comprising the step of detecting an absence of said source description control message and said quality of service resource reservation request control messages for a predetermined period of time and deleting corresponding ones of said quality of service intra IP logical subnet data trees after said predetermined period of time has elapsed.

18. The method according to claim 12, wherein said quality of service resource reservation request control messages generated by said ones of said ATM hosts receiving multicast data, further include a filter, said filter indicating said quality of service resource reservation request control messages apply to data sent by one of all current and future ones of said senders, a specific list of said senders and a fixed one of said senders.

19. The method according to claim 18, wherein when said filter indicates that said quality of service resource reservation request control messages apply to a fixed one of said senders, a separate quality of service based multicast tree is formed for said fixed one of said senders.

20. The method according to claim 18, wherein additional intra logical IP subnet quality of service based multicast trees are formed for each of said additional ones of said ATM hosts sending multicast data, said receivers being added to said additional intra logical IP subnet quality of service based multicast trees based upon said filter.

21. The method according to claim 18, wherein said receivers are partitioned into groups, said groups grouping ones of said receivers based upon same ones of said quality of service resource reservation request control messages and same ones of said filter, each of said groups operating on a separate multicast tree.

22. The method according to claim 1, wherein after said step of upgrading at least one branch of at least one of said best effort intra IP logical subnet trees to quality of service intra logical IP subnet data trees, upgraded ones of said at least one branch are removed.

23. The method according to claim 1, further comprising interoperating with protocols outside of said ATM cloud through edge switches, said edge switches being multicast switches and disposed at edges of said ATM cloud.

24. The method according to claim 23, wherein said edge switches forward group information learned from outside networks to said multicast switches in said ATM cloud.

25. The method according to claim 24, wherein said edge switches cooperate in determining a given one of said edge switches to be associated with a given outside sender disposed outside said ATM cloud, said given one of said edge switches initiating inter logical IP subnet virtual circuits and intra logical IP subnet virtual circuits in said ATM cloud for said given outside sender.

26. A network architecture for mapping quality of service based internetworking protocol (IP) multicast in a network, said IP multicast supporting at least one multicast group, said network architecture comprising an asynchronous transfer mode (ATM) cloud, said ATM cloud comprising:
- a plurality of logical IP subnets;
- a plurality of ATM hosts, wherein at least one of said plurality of ATM hosts is disposed in each of said logical IP subnets;
- a plurality of multicast switches, wherein each of said plurality of multicast switches is disposed in a respective one of said logical IP subnets, for aggregating senders outside each of said logical IP subnets for local receivers inside each of said logical IP subnets and aggregating receivers outside each of said logical IP subnets for local senders inside each of said logical IP subnets, said multicast switches communicating with each other using ATM protocols; and
- a plurality of multicast address resolution servers, wherein one of said plurality of multicast address resolution servers is located in each of said logical IP subnets for resolving an IP multicast address to ATM addresses of receivers joining one of said at least one multicast group represented by a multicast address;
- further comprising edge switches for aggregating ones of said ATM hosts receiving multicast data inside said ATM cloud, for senders outside said ATM cloud and aggregating receivers outside said ATM cloud for ones of said ATM hosts sending multicast data inside said ATM cloud, said edge switches being ones of said multicast switches disposed at edges of said ATM cloud.

27. A network architecture according to claim 26, wherein said edge switches interoperate with inter domain multicast routing (IDMR) protocols used outside said ATM cloud for sending and receiving multicast route and membership information about said ATM cloud.

28. A network architecture according to claim 27, wherein for each of said senders outside said ATM cloud, only one of said edge switches establishes a multicast tree within said ATM cloud.

29. In a network architecture for mapping internetworking protocol (IP) multicast and integrated services over an asynchronous transfer mode (ATM) network, said network architecture comprising an ATM cloud including a plurality of multicast switches and local ATM hosts, said ATM cloud further including a plurality of logical IP subnets, each of said logical IP subnets containing one of said multicast switches and at least one of said local ATM hosts, said multicast switches communicating with each other using ATM protocols, wherein each of said multicast switches comprises:
- switching fabric allowing incoming virtual circuits to feed multiple outgoing virtual circuits;
- a switch controller for controlling said switching fabric to establish header translation tables for said virtual circuits;
- an ATM signaling software module for establishing said virtual circuits using ATM signaling, said switch controller being capable of terminating said virtual circuits and concatenating said virtual circuits on two different links, thereby allowing data on one of said incoming virtual circuits to be forwarded by said switching fabric on one of said outgoing virtual circuits without software intervention; and
- a multicast routing module, including a module for maintaining group membership information for said logical IP subnets, and a module for communicating with peer functions on said multicast switches in said ATM cloud for exchanging summarized local membership information.

30. A network architecture according to claim 29, wherein said multicast switches further comprise:
- a resource reservation protocol message handling module for terminating resource reservation control messages from said multicast switches in said network architecture and from said local ATM hosts;
- a call admission control module connected to said resource reservation protocol message handling module for determining if sufficient resources may be reserved for a new data flow when said resource reservation protocol message handling module receives a resource reservation for said new data flow; and
- a virtual circuit management module for establishing virtual circuits for said new flow when said call admission control module determines sufficient resources may be reserved.

31. A network architecture according to claim 30, wherein said virtual circuit management module comprises a first part for establishing intra logical IP subnet virtual circuits and inter logical IP subnet virtual circuits and a second part for concatenating any two of said intra logical IP subnet virtual circuits and said inter logical IP subnet virtual circuits into one virtual circuit, said two virtual circuits terminating in a respective one of said multicast switches, said intra logical IP subnet virtual circuits and inter logical IP subnet virtual circuits forming a multicast tree among said multicast switches.

32. A network architecture according to claim 31, wherein said multicast tree is one of a best effort based multicast tree, a quality of service based multicast tree or a mixed best effort and quality of service based multicast tree.

33. A network architecture according to claim 31, wherein said virtual circuit management module adds ones of said ATM hosts receiving multicast data as leaf nodes to said multicast tree when said ones of said ATM hosts receiving multicast data join said multicast tree.

34. A network architecture according to claim 33, wherein said virtual circuit management module adds new ones of said multicast switches to said multicast tree when said new ATM hosts join said multicast tree.

35. A network architecture according to claim 31, wherein said virtual circuit management module removes ones of said ATM hosts receiving multicast data as leaf nodes from said multicast tree when said ones of said ATM hosts receiving multicast data leave a data flow.

36. A network architecture according to claim 35, wherein said virtual circuit management module removes ones of said multicast switches from said multicast tree when all ones of said ATM hosts receiving multicast data disposed in corresponding ones of said logical IP subnets containing said ones of said multicast switches are removed.

37. A network architecture according to claim 30, wherein at least one of said multicast switches is an edge switch for aggregating ones of said ATM hosts receiving multicast data inside said ATM cloud for hosts being senders outside said ATM cloud, and aggregating hosts being receivers outside said ATM cloud for ones of said ATM hosts sending multicast data inside said ATM cloud.

38. A network architecture according to claim 37, wherein said multicast routing module further comprises a module for providing an inter domain multicast routing (IDMR) protocol interface to IP routers located outside said ATM cloud.

39. A network architecture according to claim 38, wherein said inter domain multicast routing (IDMR) protocol interface comprises multicast routing for supported IDMR protocols for interacting with said IP routers outside said ATM cloud by sending and receiving multicast route and membership information about said ATM cloud.

* * * * *